May 8, 1934.    L. M. HARVEY    1,957,589
FRUIT CLIPPER
Filed July 26, 1933
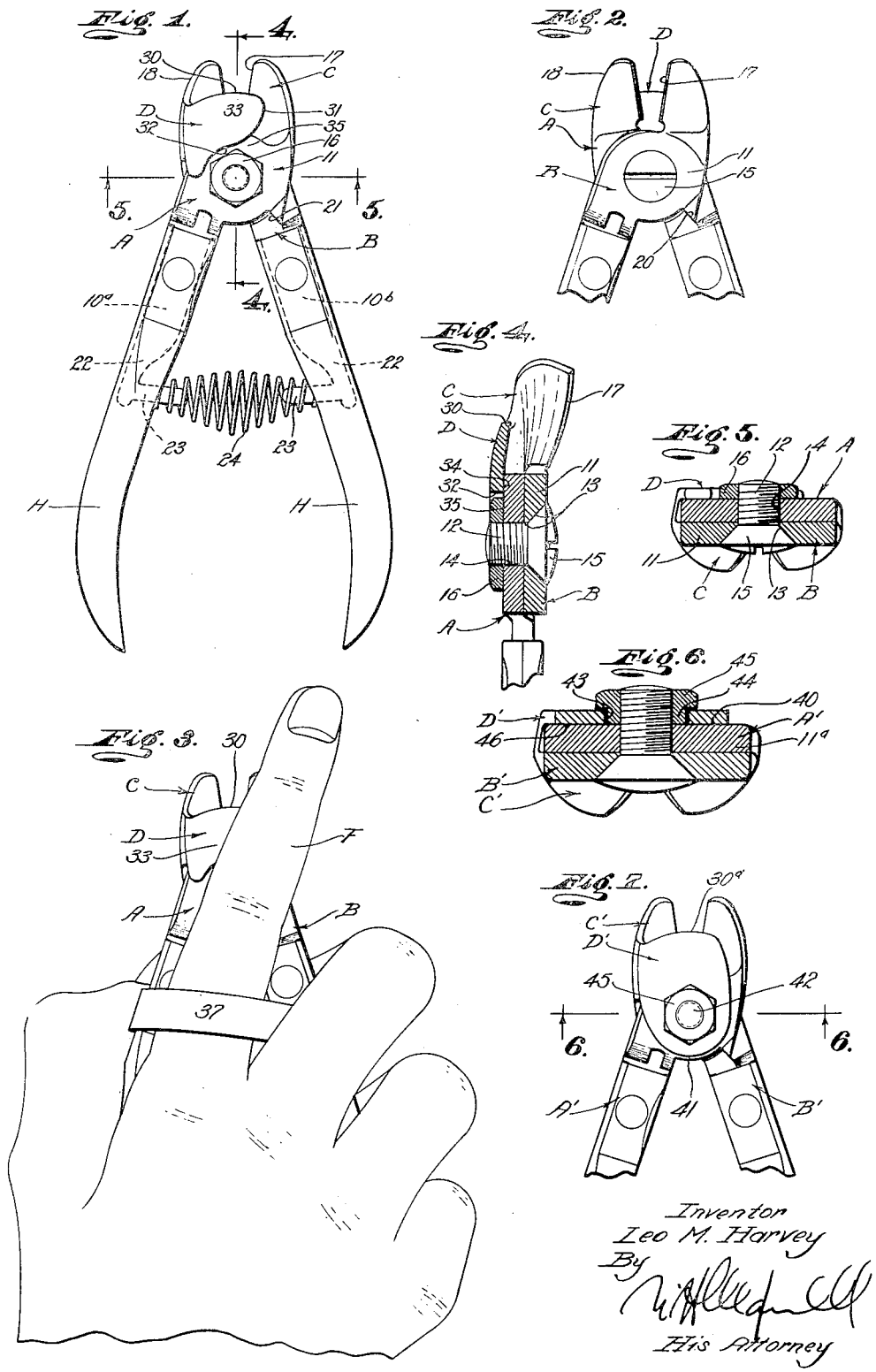
Inventor
Leo M. Harvey
By
His Attorney Patented May 8, 1934

1,957,589

UNITED STATES PATENT OFFICE 1,957,589

FRUIT CLIPPER

Leo M. Harvey, Los Angeles, Calif.

Application July 26, 1933, Serial No. 682,237

6 Claims. (Cl. 30—24)

This invention relates to fruit clippers, and it is a general object of the invention to provide simple, practical and effective fruit clippers that are particularly easy and convenient to use.

When picking fruit such as citrus etc., it is desirable to cut the fruit from their stems at the calyx so that no projecting stem parts are left on the fruit. This is often difficult when the fruit is inaccessible or is located so that their stems cannot be easily engaged.

An object of the present invention is to provide an improved fruit clipper including two pivotally connected members having cutting blades or jaws and a stop portion on one of the members projecting therefrom to engage the stems of the fruit to properly position the stems with respect to the cutting jaws, thereby facilitating easy and correct cutting of the stems.

It is another object of the invention to provide a fruit clipper comprising two pivotally connected members having cutting jaws and a stop for engaging the stems of the fruit to position them between the jaws, said stop being in the nature of a simple continuation or extension of one of the members.

It is another object of the invention to provide a fruit clipper including two pivotally connecting members having co-acting cutting jaws and a stop on one of the members projecting forwardly over the jaws for engaging the stems of the fruit to position them between the jaws, that forms an effective support for the projecting stem engaging finger of the user as well as a guard to prevent the finger from being injured by the jaws.

It is another object of the invention to provide a fruit clipper comprising two pivotally connected members having co-acting cutting jaws, and a projection or portion on one of the jaws that cooperates with the other member to prevent relative lateral play or movement between the members. In accordance with the present invention, the stem engaging stop portion on one of the members of the clipper has effective bearing engagement with the other member to prevent relative lateral play between the members, thus eliminating the necessity of providing other parts for performing this function and materially simplifying the general construction.

Another object of the invention is to provide a fruit clipper of the character mentioned in which the stem engaging portion projecting forwardly over the cutting jaws forms an effective finger guard and support, rendering the clipper particularly easy and convenient to use.

Another object of the invention is to provide a fruit clipper of the character mentioned that is simple and inexpensive of manufacture.

Other objects and features of the invention will be best and fully understood from the following detailed description of typical forms and applications of the invention, throughout which description reference is had to the accompanying drawing, in which:

Fig. 1 is a plan view of the clipper in the open position. Fig. 2 is a fragmentary elevation of the other side of the head part of the clipper. Fig. 3 is a view illustrating the manner of using the clipper. Fig. 4 is an enlarged longitudinal detailed sectional view taken as indicated by line 4—4 on Fig. 1. Fig. 5 is an enlarged transverse detailed sectional view taken as indicated by line 5—5 on Fig. 1. Fig. 6 is an enlarged transverse detailed sectional view of another form of the invention taken in as indicated by line 6—6 on Fig. 7, and Fig. 7 is a fragmentary plan elevation of said other form of the invention.

The form of the clipper illustrated in Figs. 1 to 5 inclusive of the drawing includes generally, two pivotally connected members A and B having jaws C for cutting the stems of the fruit, handles H on the members A and B, and an extension or portion D on one of the members for engaging the stems of the fruit to position them between the jaws C, and operable to support and guard a finger of the user, and to brace the clipper structure.

The two pivotally connected members A and B are substantially alike in construction and are complementary to properly fit together and cooperate during operation. In accordance with the broader principles of the invention, the members A and B may be of any suitable material and construction; however, it has been found practical to stamp or forge the members from sheet metal. The members A and B are pivotally connected intermediate their ends to have outer portions forming the jaws C and inner portions or shanks $10^a$ and $10^b$ respectively for carrying the handles H. In accordance with the invention, the members A and B are provided with broadened flat portions 11 at their point of pivotal connection. The portions 11 of the two main members bear or fit one against the other as clearly illustrated in Figs. 4 and 5 of the drawing. A pivot pin or screw 12 extends through an opening 13 in the portion 11 of the member A and is threaded through an opening 14 in the portion 11 of the member B. The screw 12 has a head 15 provided with a tapering inner end which is counter-sunk in the opening 13, the opening 13 being tapered to properly receive the head. The contacting or opposing surfaces of the portions 11 which surround the pivot screw 12 are comparatively large in area so that their cooperation is effective in guiding the members A and B during relative pivoting, and in preventing lateral play between the members. The inner and outer edges of the broadened portions 11 may be substantially concentrically curved about the pivotal axis of the clipper. A lock nut 16 may be threaded on the projecting end of the screw 12 to prevent loosening of the screw.

The cutting jaws C are parts or portions of the members A and B projecting forwardly from the portions 11. The cutting jaws C are provided to cut the stems of the fruit and are shaped and formed so as to extend or fit into the recesses in the bodies of the fruit around the stems. In accordance with the invention the cutting jaws C are curved or arcuate in transverse and longitudinal cross section. The jaws C are transversely curved downwardly and inwardly to their cutting edges 17 and are curved or cupped downwardly and forwardly toward their outer ends. It is preferred to form the cutting jaws C comparatively short and to provide them with blunt or curved outer edges 18 as illustrated throughout the drawing. In being cupped or curved in cross section as just described, the cutting jaws C may be easily set or positioned in the recess or pit of the body of the fruit so that their cutting edges 17 are operable to cut the stem immediately adjacent its point of connection with the calyx of the fruit. The cutting edges 17 may be suitably sharpened to easily and cleanly cut the stems. The blunt and rounded ends and sides of the cutting jaws C do not injure the rind or skin of the fruit.

The shanks 10$^a$ and 10$^b$ of the members A and B project rearwardly from the broadened portions 11 and carry the handles H. The shanks 10$^a$ and 10$^b$ are elongate parts and are substantially rectangular in transverse cross section. The members A and B are laterally stepped or offset in opposite directions adjacent the points of connection of the shanks 10$^a$ and 10$^b$ with the portions 11 so that the shanks lie in a common plane. Radial faces or shoulders 20 are provided on the shoulders formed where the shanks are offset from the portions 11. Projections are provided on the circumferentially curved inner edges of the portions 11 and have radial shoulders 21 adapted to cooperate with the shoulders 20 to limit opening of the jaws C.

The handles H are provided to facilitate the handling and operation of the clipper and are shaped so as to be readily held or gripped in the palm or inner side of the hand. The handles may be in the nature of elongate sheet metal parts and are longitudinally curved, and channeled in cross section. The shanks 10$^a$ and 10$^b$ are received in the inner end portions of the handles H and are connected with the handles in any suitable or practical manner. The shanks 10$^a$ and 10$^b$ are provided with reduced extensions 22 terminating in laterally or inwardly projecting pins 23. A coiled or helical spring 24 is arranged under compression between the extensions 22 to normally yieldingly hold the members A and B in positions where the jaws C are open and to automatically return the members to this position after use to condition the clipper for further use. The pins 23 project into the opposite ends of the spring 24 to retain the spring in position.

The part or portion D is provided on one of the main members of the clipper to engage the stems of the fruit to position them between the cutting jaws C, to support and guard the stem contacting finger F of the user's hand, and to prevent relative lateral movement or play between the members A and B to maintain the cutting edges 17 of the jaws in proper effective mesh or alignment. In the particular construction illustrated in the drawing, the part or portion D is provided on or forms a part of the member B. The portion D overlies or overlaps the broadened portion 11 of the member A and projects over the jaws C. The stem contacting portion D may be an integral continuation of the member B or may be welded to the member B to form a continuous integral extension thereof, depending upon the mode of manufacture that is found most suitable or practical.

The outer edge 30 of the portion D for contacting the stems of the fruit is spaced a considerable distance inwardly from the outer ends of the jaws C. In accordance with the invention the stem contacting edge 30 of the portion D is curved concentric to the axis of the pivotal connection between the members A and B. In being curved in this manner, the edge 30 does not cause shifting of the stem engaging it when the members A and B are pivoted. The portion D is preferably comparatively large being proportioned to extend completely across the cup or gap formed by the jaws C when the jaws are in their closed or cutting positions. The outer end 31 of the portion D may be suitably rounded or curved as clearly illustrated in the drawing. In accordance with the invention, the portion D extends inwardly toward the pivotal axis of the clipper to extend over or overlap a substantial part of the broadened portion 11 of the member A. The inner edge of the portion D is cut away or relieved as at 32 so as to pass the lock nut 16 with suitable clearance. The outer surface 33 of the stem contacting portion D is adapted to be engaged by the finger F of the user to form a support therefor and may be smooth and flat.

It is an important feature of the present invention that the inner surface 34 of the portion D has sliding bearing engagement with the outer surface 35 of the portion 11 of the member A. The inner surface 34 of the portion D is preferably flat and regular to have substantial cooperation with the outer surface 35 of the portion 11. The stem contacting portion D of the member B in overlapping a considerable part of the broadened portion of the member A has a large amount of its inner surface 34 in contact with the outer surface 35 of the portion 11. It is to be particularly noted that the broadened flat portion 11 of the member A is closely slidably fitted between the broadened flat portion 11 of the member B and the inner surface 34 of the portion D. This arrangement or positioning of the broadened position 11 of the member A between the broad inner surface of the portion 11 of the member B and the inner surface 34 of the portion D of the member B, positively prevents relative lateral play of the members A and B, so that the cutting edges 17 of the jaws C are maintained in their proper alignment for the effective cutting of the stems of the fruit. It will be apparent how the bearing engagement of the portion D of the member B with the opposite sides of the portion 11 of the member A prevents relative lateral play or wobbling of the members A and B even though some play may develop at the pivotal connection between the members due to wear. The stem contacting portion D of the member B, in having effective bearing engagement with the outer surface 35 of the portion 11 of the member A, prevents relative lateral play from developing in the clipper without the provision of special bearing parts in the construction. The members A and B are shaped and related so that they may be easily assembled for pivotal connection by the screw 12 without material flexing or springing of the parts.

It is believed that the utility of the clipper illustrated in Figs. 1 to 5 inclusive of the drawing and described in detail above, will be readily understood. In use, the clipper may be grasped or held in the palm or inner side of the hand so that its cutting jaws C project forwardly for cutting the stems of the fruit. The first finger F of the hand may be laid upon the face of the clipper so that it projects from the jaws C of the member A. A band 37 of leather, or the like, may be passed around or attached to the handles H to extend around one or more fingers of the user's hand for maintaining the clipper in its proper position in the hand during use. It is to be noted that the outer surface 33 of the portion D forms an effective rest or support for the finger F and prevents the finger from being cut or pinched between the jaws C. In picking the fruit the stems of the fruit may be contacted by the finger F and guided inwardly along the finger to be received between the jaws C. The outer edge 30 of the portion D engages or contacts the stems to properly position them between the cutting edges 17 of the jaws C. Pivoting of the members A and B to bring the jaws C together of course results in cutting of the stem of the fruit. The spring 24 operates to open the jaws C after the cutting operation, and holds the members A and B in the open position.

As described above, the inner surface 34 of the portion D has effective sliding bearing engagement with the outer surface 35 of the broadened portion 11 of the member A to prevent relative lateral play from developing between the members A and B of the clipper. The provision of the bearing surface 34 on the stem contacting portion D greatly simplifies the clipper construction, as it insures the proper relative guiding of the members A and B to prevent relative lateral play between the members without providing special bearing parts or elements at the pivotal connection between the members. The stem contacting and bearing portion D in being an integral part or continuation of one of the main clipper members, does not materially add to the cost of manufacture of the clipper. It will be understood how the stems of the fruit may be cut at points very close to the bodies of the fruit without injuring the rinds or skins. The jaws C are especially shaped and designed to fit into the depression or recess in the fruit surrounding the stem so that they may be passed into or positioned in this recess to cut the stem at its point of connection with the fruit. The provision of the stem contacting portion D greatly facilitates the proper picking of fruit in difficult or inaccessible positions on the trees.

In the form of the invention illustrated in Figs. 6 and 7 of the drawing, the stem contacting portion D' of the member B' overlaps and slidably cooperates with substantially the entire outer surface 40 of the portion 11ª of the member A'. The portion D' is in the nature of an integral part of the member B' and is connected with the member at the outer edge of its cutting jaw C'. The outer edge 30ª of the member D' is curved and is transverse of the cutting jaws to contact the stems of the fruit and position them between the cutting edges of the jaws. The outer surface of the portion D' is preferably smooth and flat and forms an effective rest or support for the stem engaging finger of the user's hand. In accordance with the form of the invention being described, the portion D' projects inwardly beyond the pivotal connection between the sections A' and B'. The inner edge 41 of the portion D' may be curved and substantially concentric with the pivot screw 42. An opening 43 is provided in the portion D' to receive or pass a reduced cylindrical part 44 of the lock nut 45 with suitable clearance. The polygonal projecting portion of the lock nut 45 has suitable clearance with the outer surface of the portion D'. In accordance with the invention, the inner surface 46 of the portion D' is flat and slidably bears against the outer surface 40 of the portion 11ª of the member A'. The cooperation between the surfaces 40 and 46 and between the contacting opposing surface of the two portions 11ª effectively guides the main members A' and B' and prevents relative lateral play or movement of the members. In assembling the form of the invention illustrated in Figs. 6 and 7, it may be necessary to spring or flex certain of the parts in order to snap the members A' and B' together and to position the portion 11ª of the member A' under the portion D'. The operation of the embodiment of the invention illustrated in Figs. 6 and 7 is identical with the operation of the form of the invention described above.

Having described only typical forms and applications of my invention, I do not wish to be limited or restricted to the specific forms and applications herein defined, but wish to reserve to myself any variations or modifications that may appear to those skilled in the art or fall within the scope of the following claims.

Having described my invention, I claim:

1. A fruit clipper including, two pivotally connected members having jaws to coact to cut the stem of the fruit, and an integral part on one of the members projecting over the jaws to engage the stem of the fruit and remaining in cooperation with the other member while the jaws are operated between the open and cutting positions to prevent relative lateral movement of the members.

2. A fruit clipper comprising, two pivotally connected members having jaws to cut the stems of the fruit, said clipper being characterized by a part on one of said members projecting over the jaws to engage the stems and engaging the other member while the jaws are operated between the open and cutting positions to prevent relative lateral movement between the members.

3. A fruit clipper including, two members, the members having comparatively broad portions in cooperation with one another, a screw extending through openings in said portions to pivotally connect the member, jaws on the members having cutting edges for cutting the stem of the fruit, and an integral part on the jaw of one of the members projecting over the jaws to engage the stem and cooperating with the broad portion of the other member to prevent lateral play between the members.

4. A fruit clipper including, two pivotally connected members, jaws on the members adapted to cut the stem of the fruit, one member having a side surface cooperating with a side of the other member to prevent relative lateral movement of the members in one direction, and an integral part on the first mentioned member continuously engaging the other side of said other member as the jaws are operated between the open and cutting positions to prevent relative lateral movement between the members in the other direction, said part projecting over the jaws to engage the stem of the fruit.

5. A fruit clipper including, two pivotally connected members, jaws on the members adapted to cut the stem of the fruit, one member having a side surface cooperating with a side of the other member to prevent relative lateral movement of the members in one direction, and a part on the jaw of the first mentioned member for engaging the stem of the fruit and remaining in engagement with the other side of the said other member at all times to prevent relative lateral movement between the members in the other direction.

6. A fruit clipper including, two members, the member having comparatively broad portions in cooperation with one another, a screw extending through openings in said portions to pivotally connect the member, jaws on the members having cutting edges for cutting the stem of the fruit, a lock nut on the screw, and a part on the jaw of one of the members projecting over the jaws to engage the fruit stem and cooperating with the broad portion of the other member to prevent play between the members, the said part having an opening passing the lock nut.

LEO M. HARVEY.